(12) United States Patent
Brendel et al.

(10) Patent No.: US 11,577,621 B2
(45) Date of Patent: Feb. 14, 2023

(54) ROBOT APPARATUS FOR ESTABLISHING A CHARGING CONNECTION BETWEEN A CHARGING APPARATUS AND AN ENERGY STORAGE UNIT OF A MOTOR VEHICLE

(71) Applicant: AUDI AG, Ingolstadt (DE)

(72) Inventors: Matthias Brendel, Ingolstadt (DE); Dietrich Engelhart, Kösching (DE)

(73) Assignee: AUDI AG, Ingolstadt (DE)

( * ) Notice: Subject to any disclaimer, the term of this patent is extended or adjusted under 35 U.S.C. 154(b) by 609 days.

(21) Appl. No.: 16/500,232

(22) PCT Filed: Feb. 22, 2018

(86) PCT No.: PCT/EP2018/054345
§ 371 (c)(1),
(2) Date: Oct. 2, 2019

(87) PCT Pub. No.: WO2018/184761
PCT Pub. Date: Oct. 11, 2018

(65) Prior Publication Data
US 2021/0101496 A1  Apr. 8, 2021

(30) Foreign Application Priority Data
Apr. 3, 2017 (DE) .................... 10 2017 205 594.4

(51) Int. Cl.
*B60L 53/65* (2019.01)
*H02J 7/00* (2006.01)
(Continued)

(52) U.S. Cl.
CPC ............. *B60L 53/65* (2019.02); *B25J 9/1664* (2013.01); *B60L 53/14* (2019.02); *B60L 53/16* (2019.02);
(Continued)

(58) Field of Classification Search
CPC ....... B60L 53/65; H02J 7/0042; G05D 1/0212
(Continued)

(56) References Cited

U.S. PATENT DOCUMENTS 5,306,999 A    4/1994  Hoffman
9,056,555 B1*  6/2015  Zhou ..................... B60L 53/35
(Continued)

FOREIGN PATENT DOCUMENTS

CN    104520134 A    4/2015
CN    106379185 A    2/2017
(Continued)

OTHER PUBLICATIONS

German Office Action dated Apr. 14, 2020, in connection with corresponding DE Application No. 10 2017 205 594.4 (18 pgs., including machine-generated English translation).
(Continued)

*Primary Examiner* — Suchin Parihar
(74) *Attorney, Agent, or Firm* — Maier & Maier, PLLC

(57) ABSTRACT

A robot apparatus for establishing a charging connection between a charging device and an energy storage unit of a motor vehicle, having a movement unit, by which the robot apparatus is movable in relation to the charging device and the motor vehicle, having a receptacle device, by which a charging element of the charging device can be received, can be coupled to a coupling element of the energy storage unit and subsequently released, and having a detection unit, by which a position of the coupling element on the motor vehicle is ascertainable, wherein the robot apparatus is connectable by a support device to the motor vehicle, whereby a force is transmittable from the robot apparatus to the motor vehicle.

16 Claims, 2 Drawing Sheets

(51) Int. Cl.
| | |
|---|---|
| *B60L 53/68* | (2019.01) |
| *B60L 53/14* | (2019.01) |
| *B60L 53/30* | (2019.01) |
| *B60L 53/16* | (2019.01) |
| *B60L 53/37* | (2019.01) |
| *B60L 53/18* | (2019.01) |
| *B25J 9/16* | (2006.01) |
| *G05D 1/00* | (2006.01) |
| *G05D 1/02* | (2020.01) |

(52) U.S. Cl.
CPC ............... *B60L 53/18* (2019.02); *B60L 53/30* (2019.02); *B60L 53/37* (2019.02); *B60L 53/68* (2019.02); *G05D 1/0094* (2013.01); *G05D 1/0212* (2013.01); *G05D 1/0231* (2013.01); *H02J 7/0042* (2013.01); *H02J 7/0047* (2013.01)

(58) Field of Classification Search
USPC ......................................................... 700/245
See application file for complete search history.

(56) References Cited

U.S. PATENT DOCUMENTS

| | | | | |
|---|---|---|---|---|
| 2015/0210174 A1* | 7/2015 | Settele | ..................... | B60L 53/14 320/109 |
| 2020/0238840 A1* | 7/2020 | Heestermans | .......... | B60L 53/36 |
| 2021/0001737 A1* | 1/2021 | Hoess | ................ | H01R 13/5213 |

FOREIGN PATENT DOCUMENTS

| | | |
|---|---|---|
| DE | 102009006982 A1 | 8/2009 |
| DE | 102015213160 A1 | 1/2017 |
| DE | 102015213161 A1 | 1/2017 |
| EP | 2684733 A1 | 1/2014 |
| WO | 2013041133 A1 | 3/2013 |

OTHER PUBLICATIONS

International Search Report and Written Opinion dated May 7, 2018 in corresponding International Application No. PCT/EP2018/ 054345; 26 pages.

International Written Opinion dated Mar. 14, 2019 in corresponding International Application No. PCT/EP2018/054345; 14 pages.

Car TV: "Volkswagen E-smart Connect", youtube, Jul. 14, 2015, URL:https://www.youtube.ocm/watch?v=-9VulKSy5uw, [founded in Oct. 12, 2016], cited in International Written Opinion dated Mar. 14, 2019 in corresponding International Application No. PCT/EP2018/ 054345.

Notification of Transmittal of Translation of the International Preliminary Report on Patentability dated Oct. 24, 2019, in connection with corresponding international Application No. PCT/EP2018/ 054345 (8 pgs.).

Chinese Office Action, dated Jul. 5, 2022, in corresponding Chinese Patent Application No. 201880023357.8; 15 pages.

* cited by examiner

ROBOT APPARATUS FOR ESTABLISHING A CHARGING CONNECTION BETWEEN A CHARGING APPARATUS AND AN ENERGY STORAGE UNIT OF A MOTOR VEHICLE

FIELD

The disclosure relates to a robot apparatus for establishing a charging connection between a charging device and an energy storage unit of a motor vehicle and a method for establishing a charging connection according to the preamble of the independent patent claims.

BACKGROUND

A robot for automated plugging of a charging plug into an interface of a vehicle is known from DE 10 2015 213 160 A1. This robot is designed as mobile and comprises an actuator, which grasps the charging plug of a charging column and carries out a plugging-in procedure of the charging plug into the interface. The robot comprises a detection unit for detecting the interface. After ending the plugging-in procedure, the actuator releases the charging plug and the robot moves into another position.

In addition, a robot for automatically plugging a charging plug into an interface of a vehicle is also known from DE 10 2015 213 161 A1. This robot comprises a detection unit, by means of which a location and type of the interface of the vehicle is ascertained and a charging plug for a plugging-in procedure is selected in dependence on the type of the interface.

A charging system for charging an energy source of a means of transportation is disclosed in DE 10 2009 006 982 A1. The charging system comprises a charging device and a robot unit, wherein the robot unit is embodied for automatically attaching the charging device to an interface of the energy source.

SUMMARY

The object of the present invention is to provide a robot apparatus for establishing a charging connection between a charging device and an energy storage unit of a vehicle, which is particularly simple, cost-effective, and light.

This object is achieved according to the invention by a robot apparatus and a method having the features of the independent patent claims. Advantageous embodiments having expedient refinements of the invention are specified in the respective dependent claims.

A first aspect of the invention relates to a robot apparatus for establishing a charging connection between a charging device and an energy storage unit of a motor vehicle. In this case, the robot apparatus comprises a movement unit, by means of which the robot apparatus is movable in relation to the charging device and the motor vehicle. Furthermore, the robot apparatus comprises a receptacle device, by means of which a charging element of the charging device can be received, can be coupled to a coupling element of the energy storage unit, and subsequently can be released. The robot apparatus also comprises a detection unit, by means of which a position of the coupling element on the motor vehicle is ascertainable.

According to the invention, the robot apparatus is connectable by means of a support device to the motor vehicle, whereby a force is transmittable from the robot apparatus to the motor vehicle. In other words, the robot apparatus according to the invention comprises the support device, wherein the charging connection between the charging device, which can be, for example, a power source, a gaseous fuel source, or a liquid fuel source, and the energy storage unit of the motor vehicle, which can be a battery or a tank for a gaseous fuel or a liquid fuel, is established by means of the robot apparatus. By means of the movement unit, the robot apparatus can be moved toward the charging device to receive the charging element and can be moved toward the motor vehicle to couple the charging element to the coupling element.

After the charging element is received by the receptacle device and it is moved toward the motor vehicle, the robot apparatus is, for example, before the coupling of the charging element to the coupling element, connected by means of the support device to the motor vehicle. During the coupling of the charging element to the coupling element, the force can thus be transmitted from the robot apparatus to the motor vehicle. The force is, for example, a resistance force, which can occur during the coupling and decoupling of the charging element to or from the coupling element. Because of the transmission of the force to the motor vehicle, the robot apparatus does not have to be formed solidly to absorb the force, but rather can be embodied as particularly light and therefore particularly cost-effective, since a transmission of the force to a floor is not necessary or is only necessary to a restricted extent.

The detection unit preferably comprises a camera, by means of which the position of the coupling element is detectable. In other words, the position is detected and recognized by means of camera optics. In particular, the position of the coupling element is ascertained by means of an image recognition function. The image recognition function can comprise in particular an association rule, in which a shape of the coupling element and/or a contour of the motor vehicle is associated with a respective position of the coupling element on the respective motor vehicle. The respective position of the coupling element is stored, for example, in relation to a reference point of the respective motor vehicle in the association rule. In particular, the position of the coupling element in relation to the reference point of the respective motor vehicle is ascertained by means of the detection unit and the position of the coupling element is modulated by the robot apparatus transporting the charging element to effectuate coupling between the charging element and the coupling element. The advantage results therefrom that the position of the coupling element is detectable particularly cost-effectively and simply by means of the detection unit.

In an alternative embodiment of the invention, the detection unit comprises a marking detection unit, by means of which the position of the coupling element marked by means of a transponder is detectable. In other words, the marking detection unit detects a position of the transponder, which can be, for example, an RFID chip, in particular by receiving a signal from the transponder, and ascertains therefrom the position of the coupling element marked by the transponder. This has the advantage that the robot apparatus can move the charging element positioned in a particularly accurate manner toward the coupling element, since the position of the coupling element is detectable by the robot apparatus by means of the detection unit.

In one advantageous embodiment of the invention, it is provided that the movement unit comprises a chassis, by means of which the robot apparatus is freely movable in a plane, and multiple adjustment elements. In this case, the receptacle device is adjustable by means of the adjustment element in relation to the chassis in its height and in its angle of attack. This means that the robot apparatus is freely movable by means of the chassis of the movement unit in the plane, in particular in a horizontal plane, in relation to the motor vehicle and in relation to the charging device. The chassis can comprise, for example, multiple wheels, which are freely pivotable in the spatial alignment thereof, for example, so that the robot apparatus is freely movable in the plane. In addition, the movement unit comprises the multiple adjustment elements, by means of which the receptacle device is adjustable in its height and in its angle of attack in relation to the chassis and in relation to the plane. This advantageously enables the charging element to be moved particularly close to the coupling element by means of the robot apparatus. In addition, the charging element can be adjusted in its angle of attack in relation to the chassis and in relation to the plane corresponding to an alignment of the coupling element.

The receptacle device is preferably mounted so it is rotatable around an axis of rotation on the movement unit. In this case, the axis of rotation extends in particular perpendicularly to an adjustment axis of the adjustment element, by means of which the receptacle device is adjustable around the adjustment axis in its angle of attack. The charging element can thus be arranged particularly accurately in position corresponding to the coupling element by means of the robot apparatus, to subsequently carry out a coupling of the charging element to the coupling element particularly rapidly and particularly reliably.

In a further advantageous embodiment of the invention, an opening device is provided, by means of which a closure unit of the coupling element is openable. This means that the opening device is formed corresponding to the closure unit of the coupling element in order to open it. In this case, the opening device can comprise, for example, a gripping element, a pressure element, or a magnet element to open the closure unit. The advantage results therefrom that the closure unit, which is used, for example, to protect the coupling element in a driving mode of the motor vehicle, is automatically openable by means of the robot apparatus. Opening of the closure unit of the coupling element by the driver of the motor vehicle, for example, is thus advantageously not necessary.

A second aspect of the invention relates to a method for establishing a charging connection by means of a robot apparatus between an energy storage unit of a motor vehicle and a charging device for carrying out a charging procedure. For this purpose, the robot apparatus moves by means of a movement unit toward the charging device and receives a charging element of the charging device by means of a receptacle device. Subsequently, the robot apparatus moves by means of the movement unit with the charging element toward the motor vehicle, detects a position of a coupling element of the energy storage unit of the motor vehicle by means of a detection unit, and opens a closure unit of the coupling element by means of an opening device. The robot apparatus then couples the charging element of the charging device to the coupling element and subsequently releases the charging element.

According to the invention, the robot apparatus is connected by means of a support device to the motor vehicle, whereby a force is transmittable or is transmitted, respectively, from the robot apparatus to the motor vehicle. This means that the robot apparatus is supported in particular laterally on the motor vehicle by means of the support device in particular shortly before and during the coupling of the charging element to the coupling element. This lateral support is used to transmit the force from the robot apparatus to the motor vehicle, which occurs in particular during a coupling procedure and during a decoupling procedure of the charging element to or from the coupling element. This advantageously enables a particularly light and simple design of the robot apparatus, whereby additional costs can be saved.

In a further design of the method, it is provided that the detection unit ascertains the position of the coupling element via an association rule, in which respective positions of coupling elements are associated with respective motor vehicle types, to move the charging element accurately in position toward the coupling element and couple it thereto. In particular, the detection unit comprises a camera, by means of which the motor vehicle is recordable or detectable, wherein a vehicle type of the recorded motor vehicle is ascertainable in a processing unit by means of the recording of the camera. The respective position of the coupling element of the recorded motor vehicle can be ascertained in dependence on the vehicle type by means of the processing unit via the association rule. For this purpose, the respective positions of coupling elements are associated with respective motor vehicle types in the association rule, which is stored in the processing unit. In this case, the processing unit can be, for example, a part of the robot apparatus or alternatively can be arranged outside the robot apparatus and can communicate with a processing unit of the robot apparatus, for example, via the Internet or via radio. The robot apparatus can thus advantageously move the charging element accurately in position toward the coupling element and couple it thereto.

The robot apparatus, after completion of the charging procedure of the energy storage unit by the charging device, preferably supports itself by means of the support device against the vehicle, receives the charging element and removes it from the coupling element, closes the closure unit of the coupling element, and moves away from the motor vehicle with the charging element. Due to the support of the robot apparatus by means of the support device against the motor vehicle, the force can be transmitted from the robot apparatus to the motor vehicle, wherein the force can occur in particular during the removal of the charging element from the coupling element. Due to the support of the robot apparatus by means of the support device on the motor vehicle, in particular tipping over of the robot apparatus can be avoided. The removal of the charging element from the coupling element, the closing of the closure unit, and the moving of the robot apparatus away from the motor vehicle with the charging element are used to produce a state in which the motor vehicle is ready to drive away.

The invention also includes refinements of the method according to the invention, which comprise features as have already been described in conjunction with the refinements of the robot apparatus according to the invention. For this reason, the corresponding refinements of the method according to the invention are not described once again here.

BRIEF DESCRIPTION OF THE DRAWINGS

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another and thus are to be considered to be a component of the invention individually or in a combination other than that shown. Furthermore, the described embodiments can also be supplemented by further ones of the above-described features of the invention.

In the figures, functionally-identical elements are each provided with the same reference signs.

Figure 1:
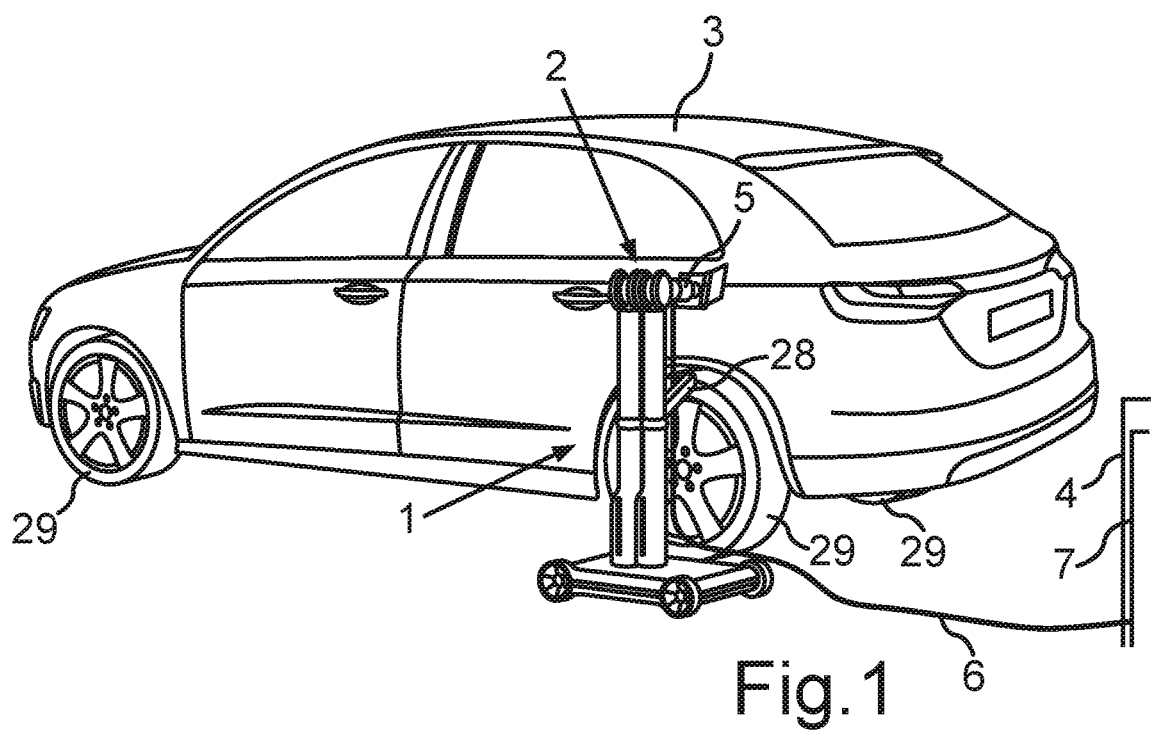
FIG. 1 shows a perspective view of a robot apparatus while establishing a charging connection between a charging device and an energy storage unit of a motor vehicle.

In FIG. 1, a robot apparatus 1 is illustrated while establishing a charging connection between a charging device 4 comprising an energy accumulator 7 and an energy storage unit 2 of a motor vehicle 3. The charging device 4 comprises the energy accumulator 7 and a charging element 5 and also a cable element 6 in the present case. An energy carrier or energy is transferable from the energy accumulator 7 of the charging device 4 to the charging element 5 via the cable element 6. The charging element 5 can be moved toward the motor vehicle 3 by means of the robot apparatus 1 and can be coupled to a coupling element 8 of the energy storage unit 2 of the motor vehicle 3. The energy which is transferred from the energy accumulator 7 of the charging device 4 by means of the charging element 5 to the energy storage unit 2 of the motor vehicle 3 can be electrical energy or electric current. The energy carrier is, for example, a gaseous fuel or a liquid fuel. The energy storage unit 2 of the motor vehicle can be a tank for a gaseous fuel or a liquid fuel or a battery. In the presently described exemplary embodiment, the energy storage unit 2 is a battery and the energy carrier is current.

Figure 2:
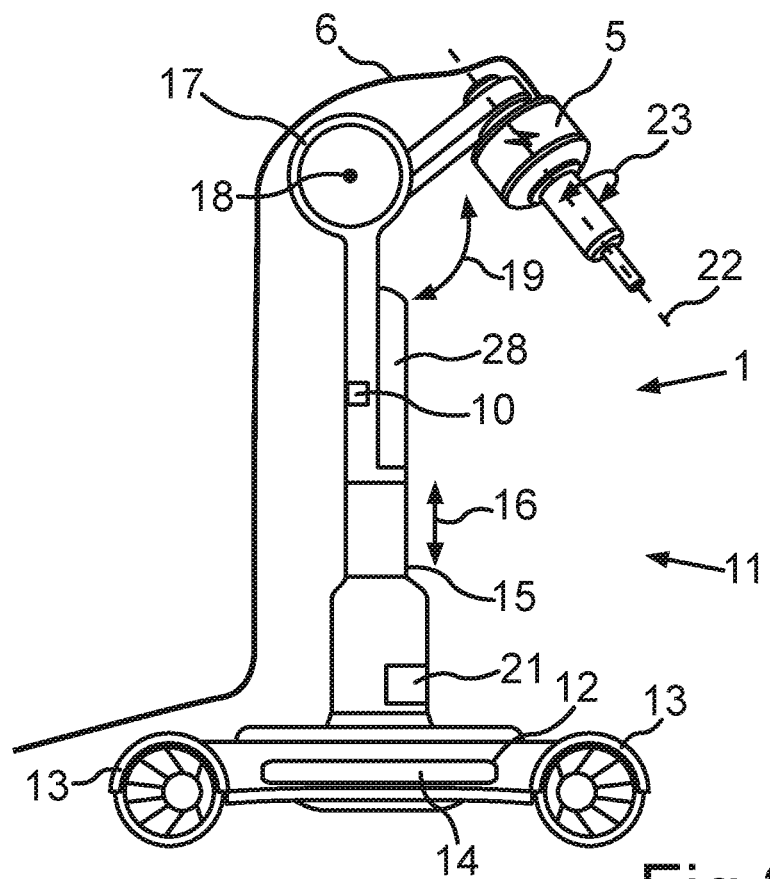
FIG. 2 shows a schematic side view of the robot apparatus having a movement unit, a receptacle device, on which a charging element of the charging device is received, and a detection unit.

In FIG. 2, the robot apparatus 1 is shown in greater detail in a schematic side view. As can be seen in FIG. 2, the robot apparatus 1 comprises a receptacle device 9, a detection unit 10, and a movement unit 11. The movement unit 11 comprises a chassis 12, which comprises multiple wheels 13 and a base plate 14 in the present case. By means of the chassis 12, the robot apparatus 1 can be moved freely in a horizontal plane. In this way, the robot apparatus 1 can move toward both the motor vehicle 3 and also the charging device 4. The movement unit 11 additionally comprises two adjustment units in the present case, wherein the receptacle device 9 is adjustable along the direction 16 by means of a height adjustment unit 15. The second adjustment element is an angle adjustment element 17, by means of which the receptacle device 9 is adjustable in its angle of attack around the adjustment axis 18 along the direction 19.

The detection unit 10 is designed in the present case as a marking detection unit, by means of which a position of the coupling element 8 marked by means of a transponder 20 is detectable. In this case, the detection unit 10 comprises a transmitting element (not shown) and a receiving element (not shown), by means of which the detection unit 10 can communicate with the transponder 20 to ascertain the position of the coupling element 8. In the present case, the robot apparatus 1 comprises a processing unit 21, which controls or regulates a movement of the robot apparatus 1 by means of the movement unit 11 in dependence on the position of the coupling element 8 ascertained by means of the detection unit 10. The receptacle device 9 is rotatable on the movement unit 11 around an axis of rotation 22 along the direction 23. In this case, the axis of rotation 22 extends in particular perpendicularly in relation to the adjustment axis 18. If the charging element 5 is received on the receptacle device 9, the charging element 5 is thus also rotatable by means of the receptacle device 9 around the axis of rotation 22 along the direction 23.

The robot apparatus 1 additionally comprises a support device 28, by means of which the robot apparatus 1 is connectable to the motor vehicle 3 and a force is transmittable from the robot apparatus 1 to the motor vehicle 3. The robot apparatus 1 can support high forces, which can result during the coupling and decoupling of the charging element 5 to or from the coupling element 8 or during the plugging and unplugging of the plug element 24 into and out of the receptacle openings 25, respectively, on a vehicle part of the motor vehicle 3. In the present case, the robot apparatus 1 supports the force on a vehicle part of the motor vehicle 3 which is not sensitive to damage. The support on the motor vehicle 3 can take place on a wheel 29, on a tire, on wheel bolts, on a rim, on a receptacle for a car jack, or alternatively on a door handle. In the present case, the robot apparatus 1 is connected by means of the support device 28 to the wheel 29 of the motor vehicle 3. The wheel 29 is particularly suitable for this purpose, because it is clamped from two sides, clung to by pressure from one side, or can be used as a support by a form fit with the tire profile without a risk of damage existing.

Because of the support device 28, the robot apparatus 1 can be constructed particularly lightly and particularly cost-effectively. In addition, the robot apparatus 1 is a particularly simple robot, also called a low-tech robot. For the power supply, the robot apparatus 1 is supplied with energy by means of a network cable (not shown). A large energy accumulator is thus not necessary for the robot apparatus 1, whereby the weight of the robot apparatus 1 can be kept particularly low. Overall, the robot apparatus 1 is thus a simple, light, and cost-effective low-tech robot.

Figure 3:
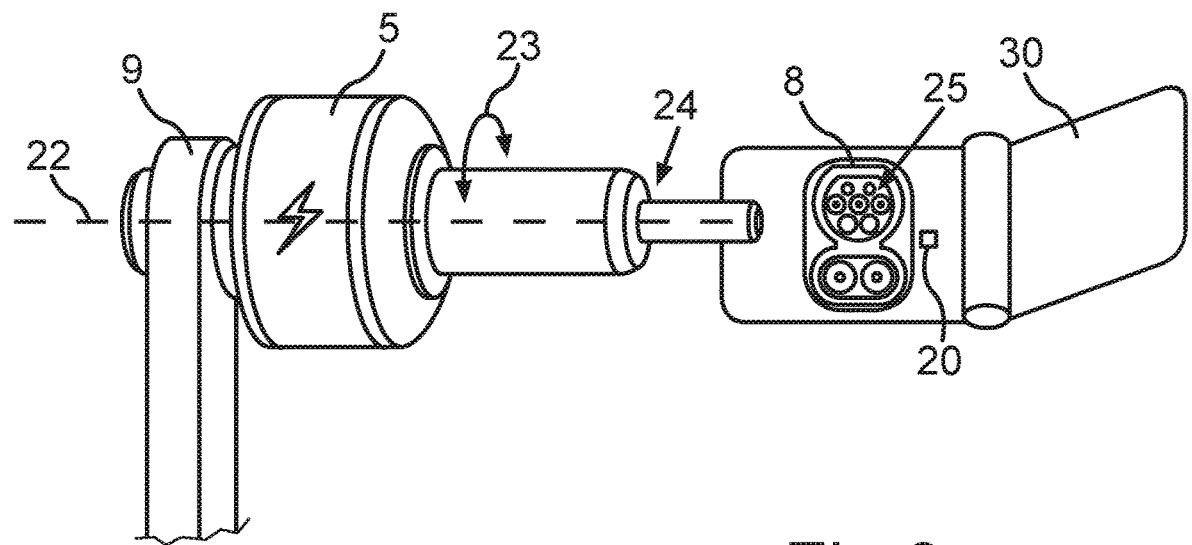
FIG. 3 shows a schematic side view of the receptacle device having the charging element, the charging device, and a coupling element of the motor vehicle, to which the charging element can be coupled to establish the charging connection.

The receptacle device 9 having the charging element 5 and the coupling element 8 is shown in FIG. 3 in a schematic side view. As can be seen in FIG. 3, the charging element 5 comprises a plug element 24, which is plugged into corresponding receptacle openings 25 of the coupling element 8 during a coupling of the charging element 5 to the coupling element 8. A connection can be provided in this way in the present case, via which current can be transferred from the energy accumulator 7 by way of the energy storage unit 2.

Figure 4:
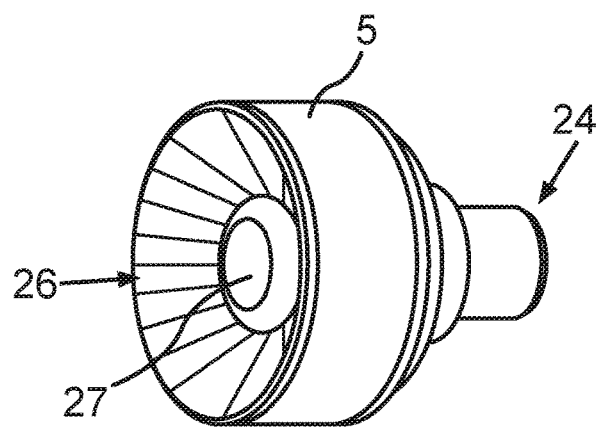
FIG. 4 shows a schematic perspective view of the charging element.

FIG. 4 shows the charging element 5 in a schematic perspective view. It can be seen in FIG. 4 that the charging element 5 comprises a receptacle element 26, by means of which the charging element 5 can be received by the receptacle device 9. In this case, the receptacle element 26 comprises a magnetic element 27 in the present case, which can be engaged with a magnet of a magnet unit (not shown) of the receptacle device 9. In this way, a particularly reliable reversible connection can be enabled between the receptacle device 9 and the charging element 5.

Presently, charging elements 5 for the conductive charging of a motor vehicle 3, which is electrically operable in the present case, have to be coupled by a driver or a service employee to the coupling element 8. The plugging and unplugging of the charging element 5 greatly restricts a comfort during a usage of the electrically operable motor vehicle 3. Furthermore, only one motor vehicle 3 per charging device 4, in particular a charging column or wall box, can be charged without activity. The charging element 5 of the charging device 4, in particular the charging column or wall box, can be plugged and unplugged on all commercially available electrically operable motor vehicles 3 by the robot apparatus 1. This has the result that the driver of the motor vehicle 3 does not have to connect the charging element 5 to the motor vehicle 3 themselves. The connection of the charging device 4 to the motor vehicle 3 via the charging element 5 and the coupling element 8 takes place by means of the robot apparatus 1. It is thus possible to charge multiple vehicles 3 sequentially by means of the same charging device 4, by the robot apparatus 1 coupling the charging element 5 and thus the charging device 4 to a second motor vehicle 3 after completion of a charging procedure of a first motor vehicle 3. After a charging procedure of the second motor vehicle 3, the robot apparatus 1 can couple the charging device 4 to a third motor vehicle 3. Therefore, without human action, multiple motor vehicles 3 can be charged with energy, for example, overnight, by means of the charging device 4, which can be in particular a fast charging point.

To establish the charging connection, the robot apparatus 1 having the receptacle device 9 receives the charging element 5 of the charging device 4. Subsequently, the robot apparatus 1 moves toward the motor vehicle 3. By means of the detection unit 10, the robot apparatus 1 detects the position of the coupling element 8 via the position of the transponder 20, in particular an RFID chip. Subsequently, the robot apparatus 1 opens a closure unit 30 of the coupling element 8 by means of an opening device (not shown). By means of the receptacle device 9, the robot apparatus 1 effectuates a coupling between the charging element 5 and the coupling element 8 and subsequently releases the charging element. After completion of the charging procedure of the energy storage unit 2, the receptacle device 9 of the robot apparatus 1 receives the charging element 5, decouples it from the coupling element 8, closes the closure unit of the coupling element 8, and moves the charging element 5 away from the motor vehicle 3.

The invention claimed is:

1. A robot apparatus for establishing a charging connection between a charging device and an energy storage unit of a motor vehicle, the robot apparatus comprising:
a movement unit, by which the robot apparatus is movable in relation to the charging device and the motor vehicle,
a receptacle device in which a charging element of the charging device is detachably receivable and by which the charging element is coupleable to a coupling element of the energy storage unit, wherein the receptacle device comprises a magnetic unit and the charging element comprises a corresponding magnetic element for attaching the charging element to the receptacle device,
a detection unit, by which a position of the coupling element on the motor vehicle is ascertainable, and
a support device, separate from the receptacle device and the charging element, by which the robot apparatus is rigidly and detachably connectable to the motor vehicle.

2. The robot apparatus as claimed in claim 1, wherein the detection unit comprises a camera for detecting the position of the coupling element.

3. The robot apparatus as claimed in claim 1, wherein the detection unit is configured to communicate with a transponder arranged on the motor vehicle to detect the position of the coupling element.

4. The robot apparatus as claimed in claim 1, wherein the movement unit comprises a chassis, by which the robot apparatus is freely movable in a plane, and multiple adjustment elements, by which the receptacle device is adjustable in height and in angle relative to the chassis.

5. The robot apparatus as claimed in claim 1, wherein the receptacle device is mounted to be rotatable relative to an axis of rotation corresponding to an axis of the charging element.

6. The robot apparatus as claimed in claim 1, further comprising an opening device by which a cover of the coupling element is operable.

7. The robot apparatus as claimed in claim 6, wherein the opening device comprises a magnet.

8. A method for establishing, via a robot apparatus, a charging connection between an energy storage unit of a motor vehicle and a charging device for carrying out a charging procedure, the method comprising:
moving the robot apparatus towards the charging device,
receiving, in a receptacle device of the robot apparatus, a charging element of the charging device,
moving the robot apparatus towards the motor vehicle,
detecting, using a detection unit of the robot apparatus, a position of a coupling element of the energy storage unit,
securing the robot apparatus to the motor vehicle using a support device of the robot apparatus,
opening a cover of the coupling element using an opening device of the robot apparatus, and
coupling the charging element to and subsequently releasing the charging element from the coupling element,
wherein the receptacle device comprises a magnetic unit and the charging element comprises a corresponding magnetic element for detachably receiving the charging element in the receptacle device, and
wherein the support device rigidly and detachably secures the robot apparatus to the motor vehicle and the support device is separate from the receptacle device and the charging element.

9. The robot apparatus as claimed in claim 1, wherein the support device connects to a wheel of the motor vehicle.

10. The robot apparatus as claimed in claim 1, wherein the support device connects to at least one of a car jack receptacle of the motor vehicle and a door handle of the motor vehicle.

11. The robot apparatus as claimed in claim 1, wherein the support device grips a tire of the motor vehicle.

12. The method as claimed in claim 8, wherein the opening device comprises a magnet.

13. The method as claimed in claim 12, wherein the detection unit ascertains the position of the coupling element via an association rule, in which respective positions of the coupling element are associated with respective motor vehicle types.

14. The method as claimed in claim 12, wherein the support device connects to a wheel of the motor vehicle.

15. The method as claimed in claim 12, wherein the support device connects to at least one of a car jack receptacle of the motor vehicle and a door handle of the motor vehicle.

16. The method as claimed in claim 12, wherein the support device grips a tire of the motor vehicle.

\* \* \* \* \*